United States Patent
Khubani

(10) Patent No.: US 11,813,735 B2
(45) Date of Patent: Nov. 14, 2023

(54) FOLDABLE AND LOCKABLE GRABBER TOOL

(71) Applicant: ONTEL PRODUCTS CORPORATION, Fairfield, NJ (US)

(72) Inventor: Ashok Khubani, Palm Beach Gardens, FL (US)

(73) Assignee: Ontel Products Corporation, Fairfield, NJ (US)

( * ) Notice: Subject to any disclaimer, the term of this patent is extended or adjusted under 35 U.S.C. 154(b) by 197 days.

(21) Appl. No.: 17/365,567

(22) Filed: Jul. 1, 2021

(65) Prior Publication Data
US 2023/0001565 A1 Jan. 5, 2023

(51) Int. Cl.
*B25J 1/02* (2006.01)

(52) U.S. Cl.
CPC ...................... *B25J 1/02* (2013.01)

(58) Field of Classification Search
CPC ...... B25J 1/02; B25J 1/04; B25J 18/04; A47F 13/06; B25G 1/06; Y10T 16/540253; Y10T 16/540254; Y10T 16/240255; Y10T 16/240256
USPC .................... 294/209, 210; 135/74
See application file for complete search history.

(56) References Cited

U.S. PATENT DOCUMENTS

| | | | | |
|---|---|---|---|---|
| 2,630,730 A * | 3/1953 | Thornton | ................. | B25G 1/06 403/328 |
| 4,374,600 A * | 2/1983 | van Zelm | ................. | B25J 1/04 294/111 |
| 4,527,579 A * | 7/1985 | Knotter | ................. | A45B 9/00 403/100 |
| 4,613,179 A * | 9/1986 | van Zelm | ................. | A61F 2/588 294/111 |
| 5,265,969 A * | 11/1993 | Chuang | ................. | F16C 11/045 16/329 |
| 6,438,848 B1 | 8/2002 | McHenry et al. | | |
| 6,848,731 B2 | 2/2005 | Khubani | | |
| 7,600,287 B1 * | 10/2009 | Moore | ................. | A46B 5/0075 15/144.4 |
| 7,686,361 B1 * | 3/2010 | Flinn | ................. | E01H 1/1206 294/111 |
| 7,980,609 B2 | 7/2011 | Khubani | | |
| D785,425 S | 5/2017 | Montgomery | | |
| D792,180 S | 7/2017 | Reda | | |
| 9,878,444 B1 | 1/2018 | Harrington et al. | | |
| 10,456,904 B1 | 10/2019 | Stirtz | | |
| 2014/0054912 A1 * | 2/2014 | Bustos | ................. | B25J 19/00 294/190 |

(Continued)

*Primary Examiner* — Dean J Kramer
(74) *Attorney, Agent, or Firm* — Dickinson Wright PLLC

(57) ABSTRACT

A foldable elongate grabber tool includes a proximal section and a distal section that are foldable relative to each other between a folded position and an extended position. An actuation member is attached to the proximal section and actuates a cable coupled to engagement elements disposed at the distal section. A hinge mechanism connects the proximal and distal sections. The hinge mechanism automatically locks the proximal and distal sections relative to each other when they reach the extended position. The proximal and distal sections are biased to open automatically from the folded position to the extended position. A hinge pin is biased toward a locked position, and is blocked from moving to the locked position until the proximal and distal sections reach the extended position.

17 Claims, 8 Drawing Sheets

(56) References Cited

U.S. PATENT DOCUMENTS

2021/0204685 A1* 7/2021 Christensen ......... A46B 5/0058

* cited by examiner

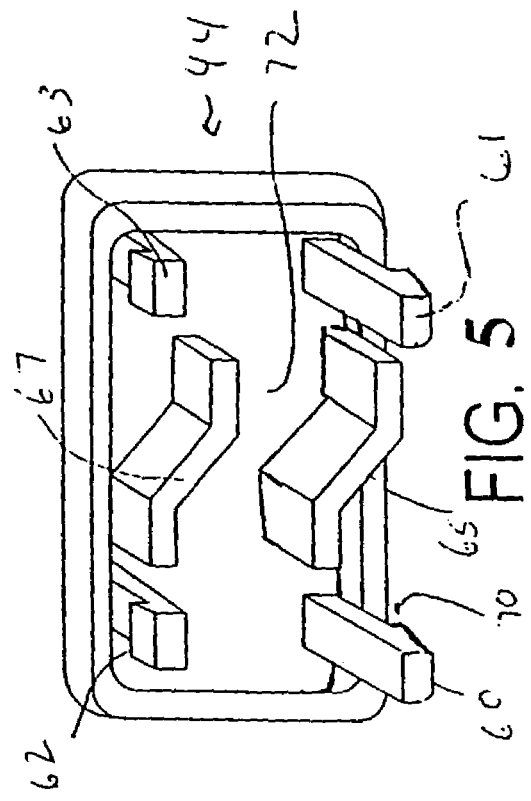
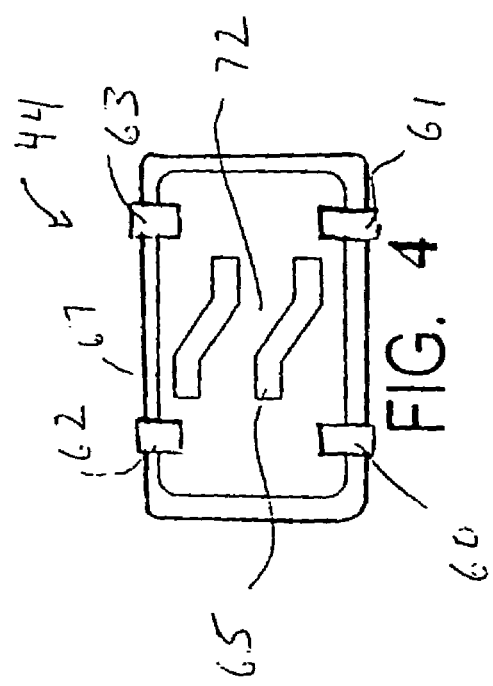

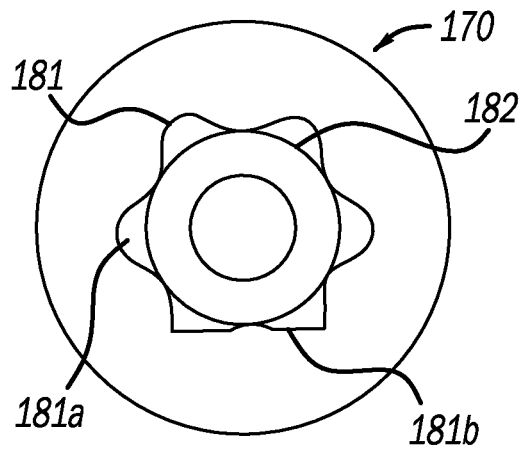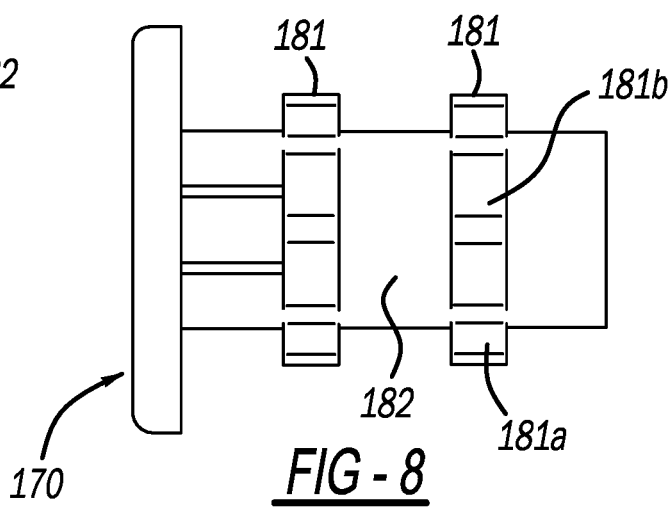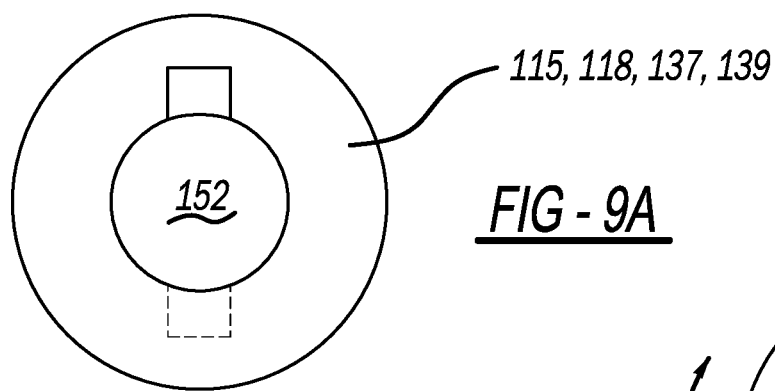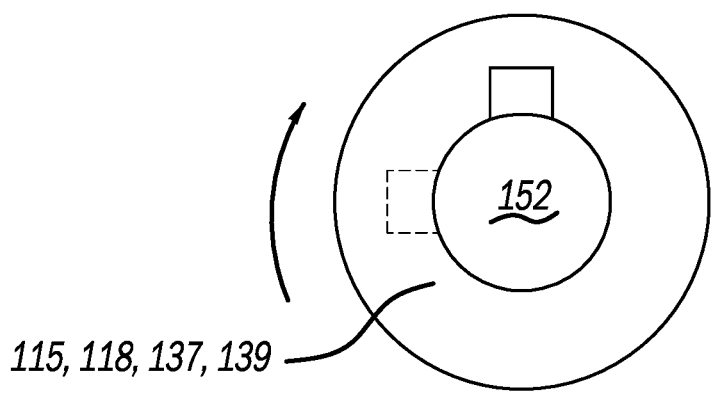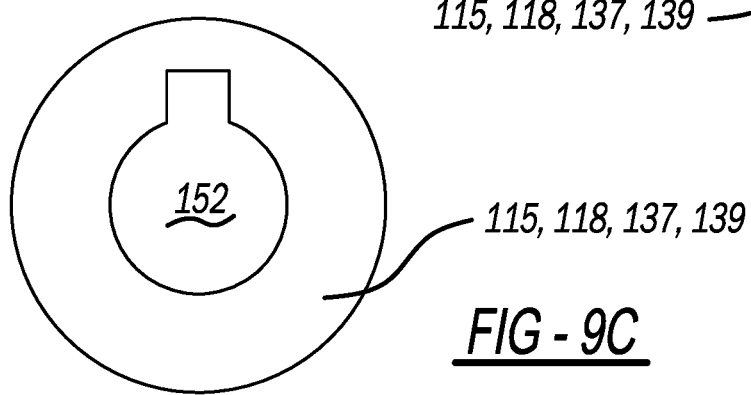

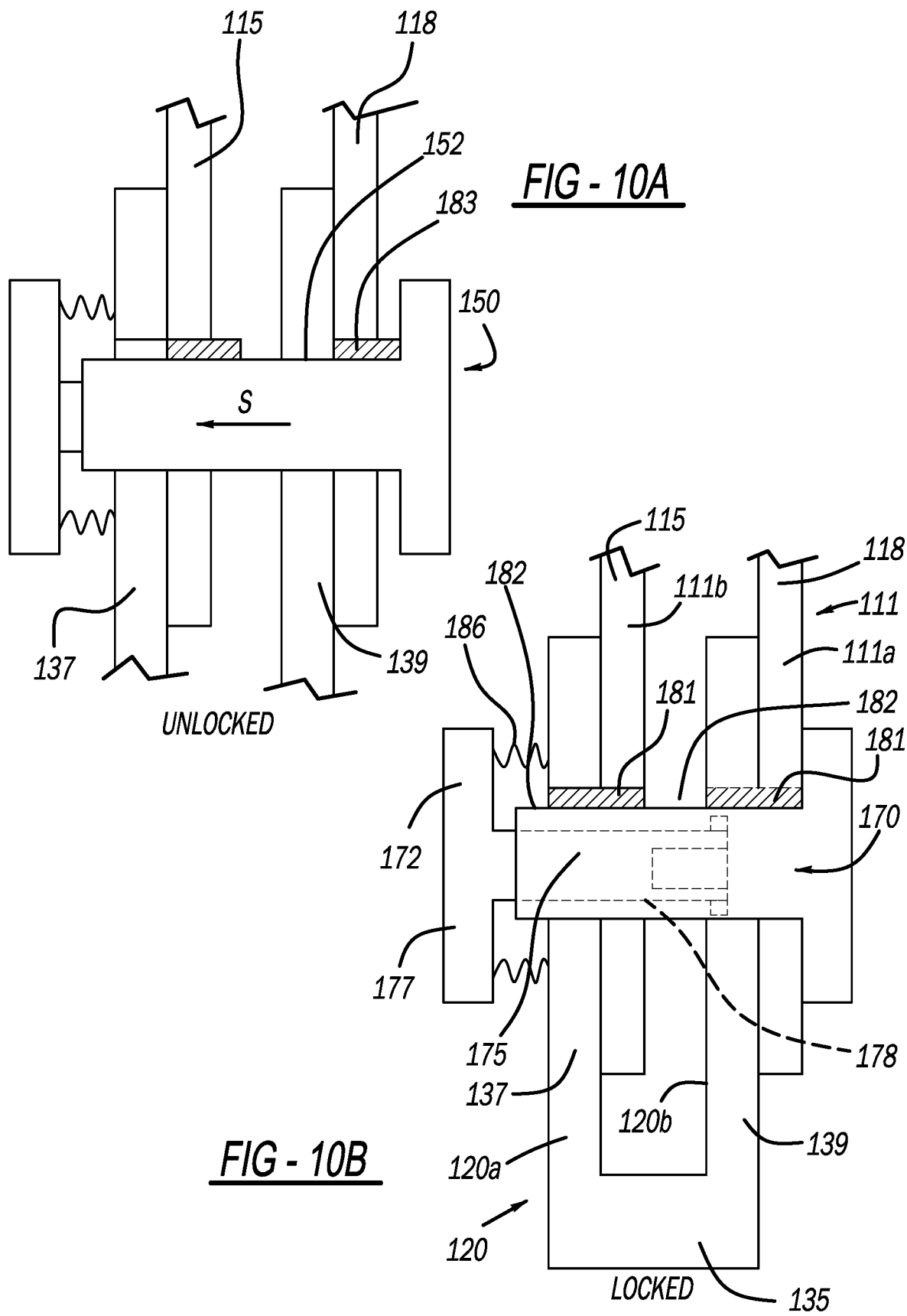

FOLDABLE AND LOCKABLE GRABBER TOOL

FIELD

This invention relates to a grabber tool designed to engage objects from remote distances. More particularly, the present disclosure relates to foldable and lockable grabber tools.

BACKGROUND

There are a wide variety of tools designed for picking up objects or manipulating objects from a distance. One common application for such tools is use by maintenance workers to pick-up debris for subsequent disposal. A tool with an elongate handle allows manipulation of the object without the need to bend over or to directly handle the material. Such tools are also useful for individuals that have physical handicaps that may impede their ability to bend over and reach the ground. There are also numerous household applications for such tools including retrieval of materials from high shelves or from under furniture. Another common application for such tools is for changing light bulbs from recessed lighting fixtures. Another entire class of devices that operate in a similar manner and perform a similar function as the pick-up tools described above are marketed as toys. Other tools may have blades on the distal end for cutting that may be used for a wide range of uses including those tools used in the surgical field and tools used for trimming high branches.

Common elements that are shared by such devices include an elongate shaft having a handle on one end and engagement elements on the opposite end, an actuation member on the handle a linkage from the actuation member to the engagement elements. Actuating the actuation member causes the engagement elements to operate. Releasing the actuation member allows the engagement elements to release. The engagement elements may include arrangements such as claws, arms, scoops, calipers, tongs, blades, cups, or the like.

However, the nature of such grabbing or reaching tools results in elongate tools that can be hard to carry and/or store, due to their extended length and size. Some grabber devices may include a hinge mechanism at the middle of the device. However, the hinge mechanism inherently results in portions of the tool that are moveable relative to each other. If one section moves relative to the other, the tool may not operate as intended. Alternatively, multiple sections may be separated from each other via threading or a press-fit or a peg and hole arrangement.

Moveable sections requires the user to manually move the sections toward the extended position or manually assemble the sections. However, such arrangements also require the user to correctly attach the sections together, and relies on the knowledge of the user for such assemblies or arrangements.

Some arrangements include fixing mechanisms that hold the parts together, but the user must manually engage these fixing mechanisms, and a failure to correctly engage the fixing mechanism can likewise lead to de-coupling or inoperability.

Accordingly, improvements can be made to foldable grabber tools.

SUMMARY

The present invention relates to a new self-opening arrangement and self-locking arrangement for a foldable grabbing tool. The invention allows the user to release proximal and distal sections of the grabber tool when the grabber device is in a folded state. Upon releasing the proximal and distal sections, they automatically unfold from a folded state to an expanded state. Upon reaching the expanded state, the sections automatically lock relative to each other, blocking the ability of the tool to be returned to the folded state. The hinge mechanism can be actuated to unlock the tool from its expanded state, thereby allowing the tool be folded back to its folded arrangement. Without actuating the hinge mechanism, the tool cannot be folded.

BRIEF DESCRIPTION OF THE DRAWINGS

FIG. 4 is a bottom view in elevation of a switch element used with a locking feature;

FIG. 5 is a perspective view of the switch element;

FIG. 7 is an end view of the exterior section of a hinge pin used with the hinge mechanism;

FIG. 8 is a side view the exterior segment of the hinge pin;

FIGS. 9A-9C provide a schematic illustration of a varying shape of a channel of the hinge mechanism at different angular positions of the hinge mechanism;

FIGS. 10A and 10B illustrates the hinge pin in both a locked and unlocked state and being biased toward the locked state.

DETAILED DESCRIPTION

Figure 1:
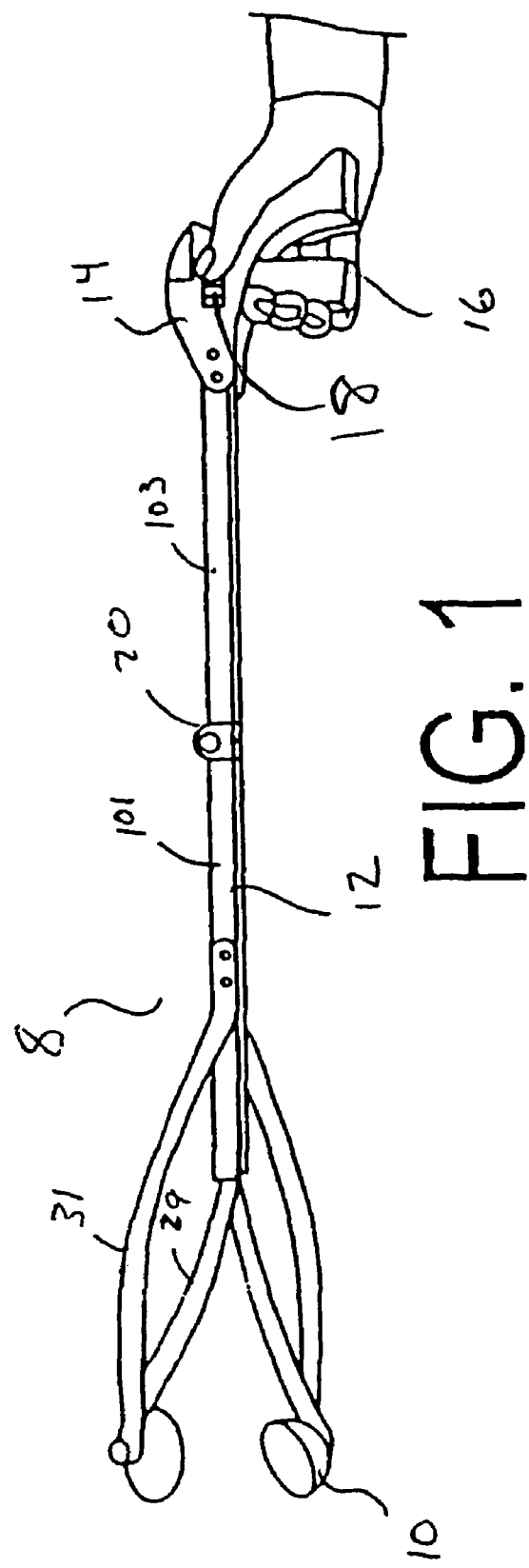
FIG. 1 is a perspective view of a grabber tool according to an aspect of the disclosure.

Now referring to FIG. 1, according to an aspect of the disclosure, an elongate grabber tool 8 is depicted in an extended position. Grabber tool 8 incorporates engagement elements 10 on a distal end of a elongate rod 12, and a pistol grip 14 on the opposite proximal end. A trigger 16 is provided adjacent to pistol grip 14 for manipulation by a user's fingers. As shown on the side of pistol grip 14, a switch 18 is provided that effects a locking feature of the engagement elements of the device. At a medial point on elongate hollow rod 12 is hinge 20 that allows elongate rod 12 to fold. The hinge 20 may include a hinge mechanism 105 with a hinge pin 150 that automatically locks the tool 8 in an extended arrangement, as described in further detail below with reference to FIGS. 6-10B.

Figure 2:
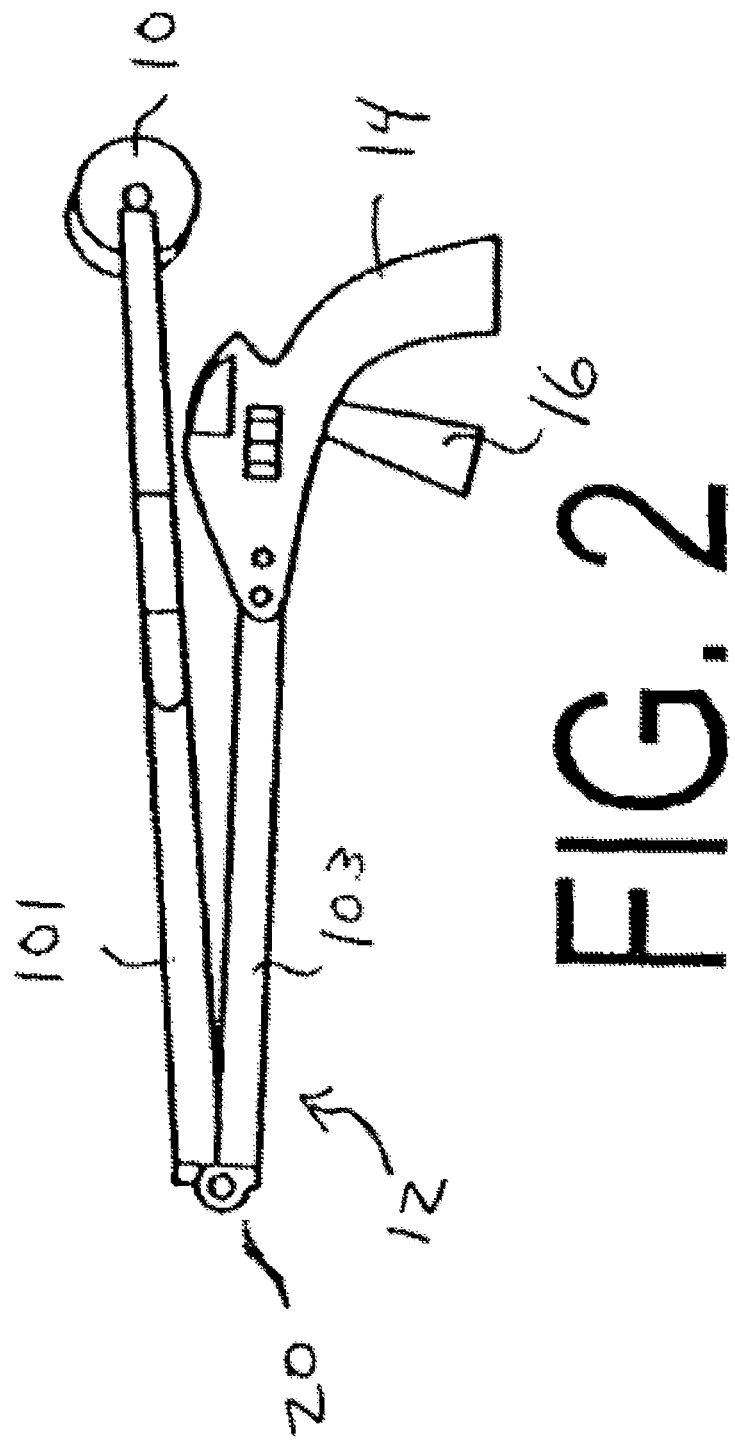
FIG. 2 is a perspective view of the grabber tool shown folded about a hinge mechanism.

FIG. 2 depicts the rod 12 in a folded position wherein the distal end of elongate rod 12 is folded back on the top side and adjacent to pistol grip 14.

In one aspect, rod 12 may be rotated and held about its longitudinal axis relative to the pistol grip, such that the distal end of the rod 12 is folded back to the side of the pistol grip, rather than the top, and such that the engagement elements at the end of the tool may be oriented different relative to the grip. The rod 12 may be secured to the side of the pistol grip via a projection at the distal end of the rod 12 that is snap-fit into a corresponding recess on the side of the grip. Other securement mechanisms may also be used, such as a hook and loop arrangement, magnets, a hook and eye-loop latch, or the like.

Figure 3:
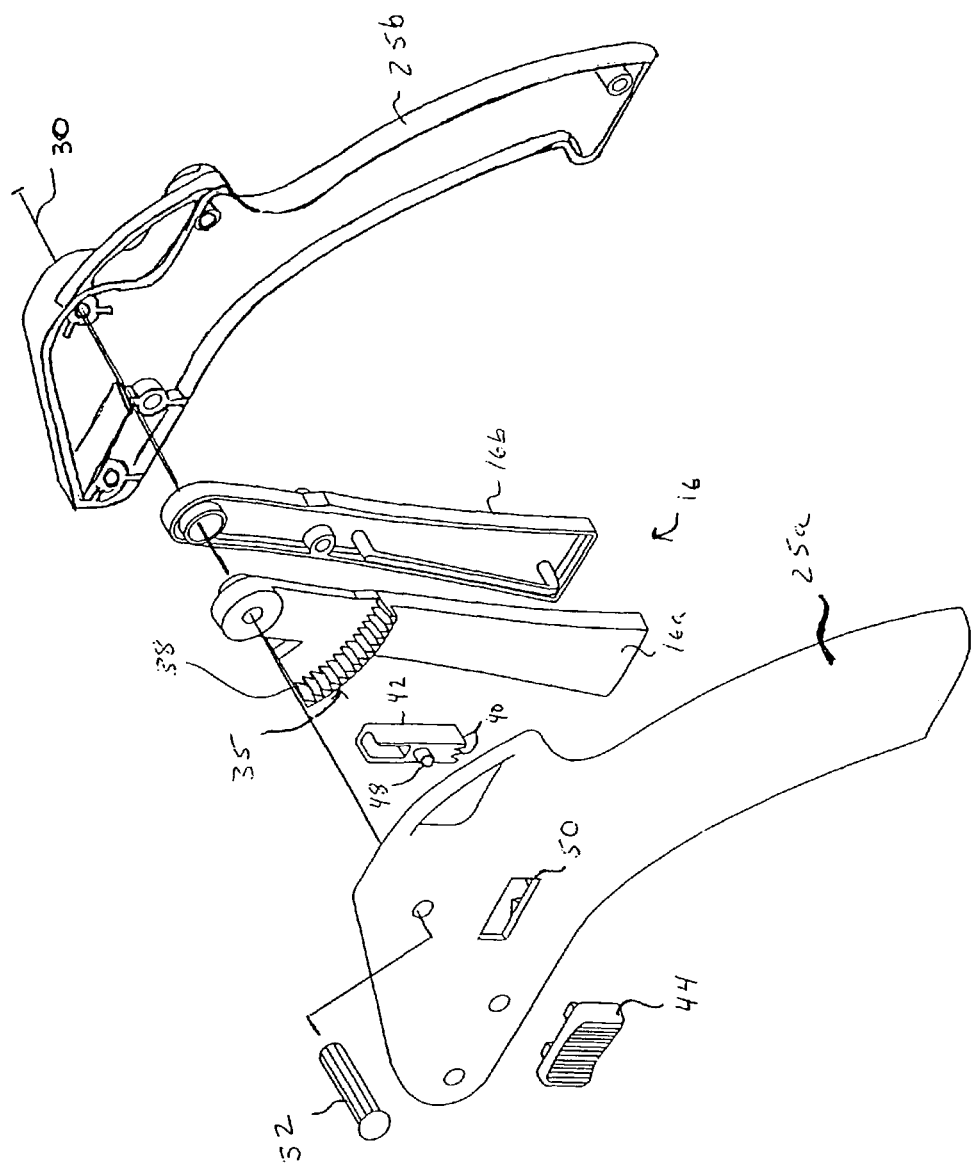
FIG. 3 is an exploded view of a handle of the grabber tool.

Now referring to FIG. 3, trigger 16 extends from and is connected to the handle at axis or pivot point 30 that is located near the top of the pistol grip 14. A connecting pin 32 transects handle side 25a, the trigger half 16a, trigger half 16b and handle side 25b. Trigger 16 extends through a slot or opening provided between the forward sides of pistol grip 14 and allows for limited pivotal movement with respect to the axis 30. As seen on trigger side 16b, a cavity is provided to retain a nipple (not shown) which is provided on the end of a cable 300 that connects trigger 16 to the engagement elements 10 on the distal end of the tool. The engagement elements 10, which are biased apart by spring members 31 are drawn together by pulling connector members 29 toward the handle 14 via the central cable 300.

Control surface 35 is an arcuate notched surface that is integral with trigger half 16a (as shown in FIG. 3) and on which is provided a series of saw-tooth notches 38. A similar control surface 35 may be integrally formed with trigger half 16b in addition to trigger half 16a. For the purposes of discussion, the control surface 35 on trigger half 16a will be described. The arc of control surface 35 is formed so that each saw tooth extension is approximately equidistant to the pivot point 30. The notches 38 are adapted to receive the end projections 40 of a stop member 42. Stop member 42 is engaged or disengaged by the fore-and-aft manipulation of switch 44. Stop member 42 also is provided with a pin member 48 that is engaged by switch 44. Stop member 42 can be disengaged by either movement of the switch in the opposite direction or by application of a force against the trigger that will push the stop member from its position. Stop member 42 is locked into place and in engagement with notches 38 on the arcuate control surface 35 by use of a mechanical locking engagement wherein switch 44 stays in position by frictional engagement.

FIGS. 4 and 5 depict the rear/inner side of switch 44, which faces and engages with stop member 42. As best seen in FIG. 5 extensions 60, 61, 62 and 63 have projections that bend away from the extensions so that the switch 44 will snap fit into opening 50 on the side of grip 16 and be retained within the opening 50, while allowing fore-and-aft sliding movement. For example, surface 70 of projection 60 will engage the interior surface of the handle side 25a adjacent to the opening 50. Since the projections only extend toward the top and bottom of the switch, the arrangement allows for the sliding movement of the switch 44 within opening 50. Walls 65 and 67 define groove 72 into which the pin member 48 of stop member 42 is received. Accordingly, sliding movement of switch 44 causes the side walls 65 and 67 to move pin 48 up-and-down, thereby causing the stop member 42 to move up or down and in or out of engagement with the control surface 35. When the stop member 42 is moved down into engagement with the control surface 35, the trigger 16 is held in place according to its position at the time the stop member 42 engages the control surface, thereby maintaining the cable in tension at a corresponding position.

In operation, a user can use the device in a manner that allows free movement of engagement elements 10 according to a variable actuation of the trigger 16 (such that a release of the trigger will allow a release of the tension in the cable and opening of the engagement elements 10) or, by manipulation of the switch 44 can cause the stop member 42 to engage the notches 38 on the trigger 16 and therefore lock the movement of the engagement elements 10 when the trigger is released by the user. The stop member can be disengaged by pulling on the trigger 16, which forces the teeth 40 of stop member 42 out of engagement with the corresponding teeth 38 on control surface 35. Additionally, the teeth 40 may also be disengaged from the opposite teeth 38 on control surface 35 by lateral movement of switch 44.

While an integral saw-toothed notched control surface 35 is depicted as a preferred embodiment, it is contemplated that other arrangements could be advantageously employed to lock the trigger. For example, a side view of the control surface could resemble a round or square waveform that has an opposite and complementary profile of teeth provided on a stop member. In a further contemplated embodiment, the control surface may be comprised of a series of cavities that have sidewalls oriented transverse to the control surface and the stop member includes an extension that can be received in the cavities. For example, in this alternative contemplated embodiment, a series of annular cavities are provided on the control surface that can receive a peg that extends from the stop member. In yet further contemplated embodiments of the invention the stop member is made of conical shaped projections or pyramid shaped projections that are received in opposite and complementary shaped cavities. The above alternative arrangements may permit similar release via movement of trigger 16 in the actuation direction or movement of the switch 44 in a direction opposite the locking direction.

The trigger locking arrangement according to the invention uses only a few parts and can therefore be economically manufactured and assembled. As described herein, the locking feature further allows for the stop member 42 to engage the control surface 35 along substantially the entire range of motion of the control surface 35 and range of the trigger 16. The switch 44 for the lock can be manipulated by the user's thumb while the handle 25 of the device is held in the user's hand.

While the controller or actuation member depicted in the preferred embodiment is a trigger designed to be engaged by multiple fingers of the user, the applicant contemplates that alternative arrangements of the trigger or controller may also be provided. For example, in an alternative embodiment the trigger may be manipulated by a user's single finger. In yet another contemplated alternative embodiment, the trigger may be displaced on the rear side of the stationary handle. Further, while in the preferred embodiment the engagement elements are opposite engagement cups, it is also contemplated that other engagement elements may also be used and that may depend on the intended application.

In accordance with an another aspect of the disclosure, as best shown in FIGS. 6-10B, the elongate rod 12 is provided in two sections, a distal section 101 and a proximal section 103. The distal section 101 is attached to the engagement elements 10 and the proximal section is attached to the handle or grip 16. The distal section 101 and the proximal section 103 are connected by a hinge structure 105 that enables the rod 12 (and therefore the device) to be folded and unfolded. Hinge 105 includes a forward hinge section 111 composed of opposite sides 111a and 111b and a rearward section 120 composed of opposite sides 120a and 120b. Sections 111 and 120 are shown in their combined state as a single unit, and may also be formed as an integral piece, as shown, or as separate pieces that are joined together to define the overall part. Rearward section 120 may include a shank portion 135 and flat knuckle sections 137 and 139 that extend from shank portion 135. A gap or space is disposed between knuckle section 137 and section 139 when assembled to define overall rear hinge section 120. The gap or space may have an axial dimension about the same distance as the as the width of one of the respective knuckles 137, 139. This gap or space may accommodate one of the knuckle sections 115 or 118. The other of knuckle sections 115 or 118 may be disposed to the side of one of the knuckles 137, 139.

Other arrangements may also be used to join each of the knuckle sections together, such as two knuckles from one rod section on one axial side and two knuckles from the other section on the other axial side. In another arrangement, two knuckles from one section may be on the outside, with two knuckles from the other section being on the other side. In yet another arrangement, a single knuckle may be used for each of the rod sections, with the single knuckle having a thickness about half the width of the hinge The knuckle sections 115 and 118 of forward hinge section 111 (which may also be referred to as forward knuckles) extend from the end of the hinge section 111 and are positioned alongside the knuckle sections 137 and 139 (which may also be referred to as rear knuckles), in one aspect. As shown in FIGS. 10A and 10B, knuckle sections 115, 118, 137, and 139 are interleaved to define an overall width of the knuckle portion of the hinge 105. When the rod 12 is folded and unfolded, the knuckle sections will rotate relative to each other. As further described below, when the rod 12 is unfolded, the knuckles will be locked relative to each other via hinge pin 150.

When assembled, knuckle sections 115, 118, 137, and 139 are adjacent to one another and define an axial channel 152 (see FIGS. 10A and 10B) that extends transverse to the direction of the elongate rod 12. Each of the forward knuckles 115 and 118 define a stop surface or wall that is configured to correspond with stop surface or wall defined by the rear knuckles 137 and 139. When the grabber device is rotated into its extended position, walls comes into contact with corresponding walls, which prevents further rotation in one direction. For example, the walls may be arranged such that the proximal section 103 and distal section 101 are stopped from rotating more than 180 degrees relative to each other. Put another way, the sections 101 and 103 are stopped from rotation once they become aligned with each other. Of course, if desired, the walls could be arranged to stop the relative rotation between sections 101 and 103 at different rotational points, such that that the sections 101 and 103 end at an oblique angle relative to each other.

The size and shape of the axial channel 152 will vary depending on the orientation of the knuckle sections relative to each other. When the sections 101 and 103 are at the desired orientation relative to each other, the channel 152 may have a shape corresponding to the shape of the outer profile of the hinge pin 150, so that the hinge pin may be received therein and lock the sections 101 and 103 relative to each other. When the rod 12 is fully unfolded, hinge pin 150 may be axially moveable to a locked position within the axial channel 152 that prevents relative movement between the knuckle sections. When the rod 12 is folded or in a partially folded state, the size and shape of the axial channel 152 may block the hinge pin 150 from axial translation into the locked position, thereby allowing the knuckle sections to continue rotating relative to each other toward the fully extended state.

Of course, the shape of the axial channel and the hinge pin may be arranged to permit translation of the hinge pin into the channel (and a corresponding locked state) at intermediate locations of travel between the folded and unfolded state.

FIGS. 10A and 10B illustrate the unlocked and locked state of the hinge 105 in a schematic manner. As shown in FIG. 10A, hinge pin 150 is not fully inserted into channel 152, and is blocked from being fully inserted. In FIG. 10B, hinge pin 150 is permitted to move to the left into the locked position.

Figure 6:
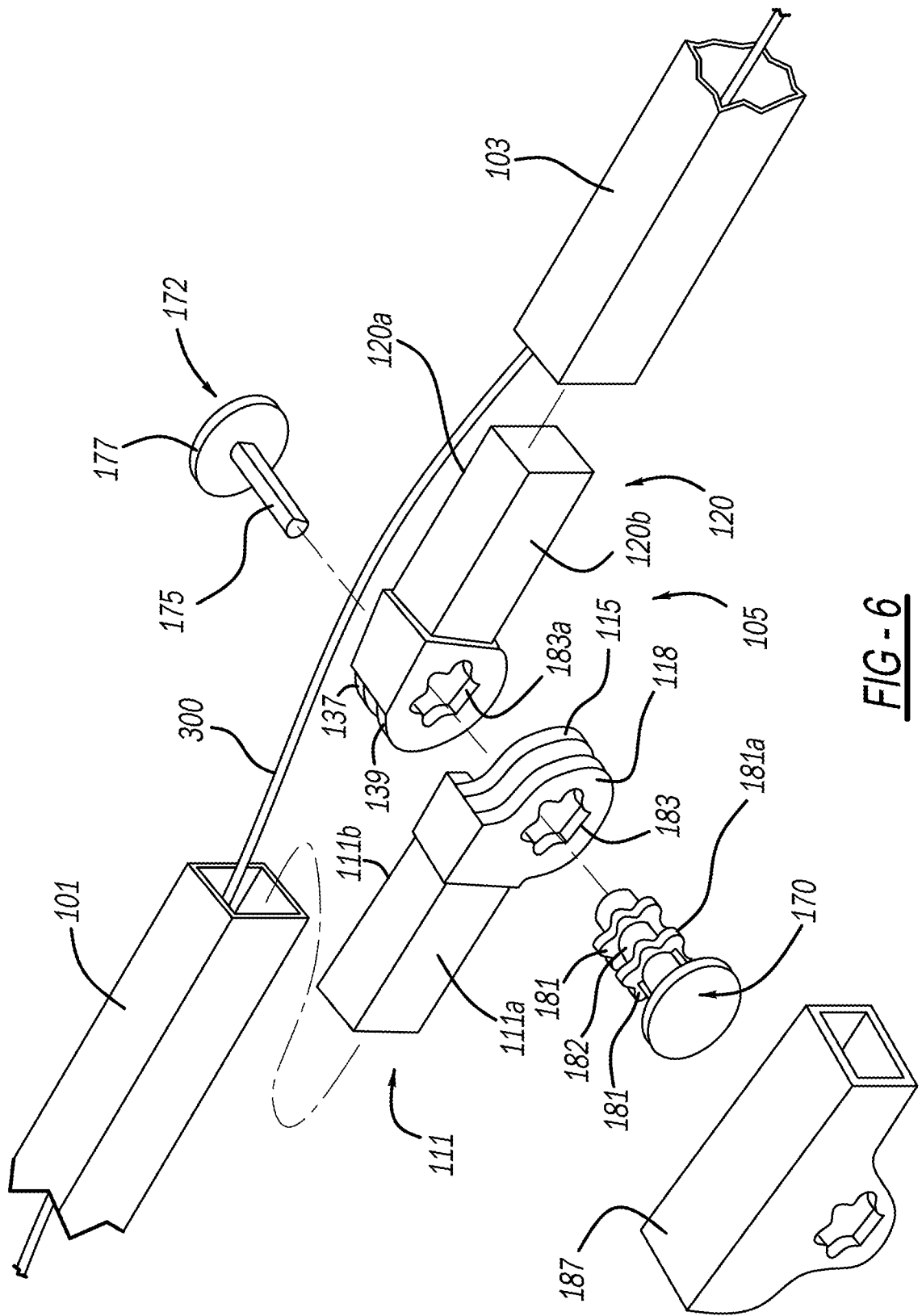
FIG. 6 is an exploded view of the hinge mechanism of the grabber tool having an automatic locking mechanism.
Figure 11:
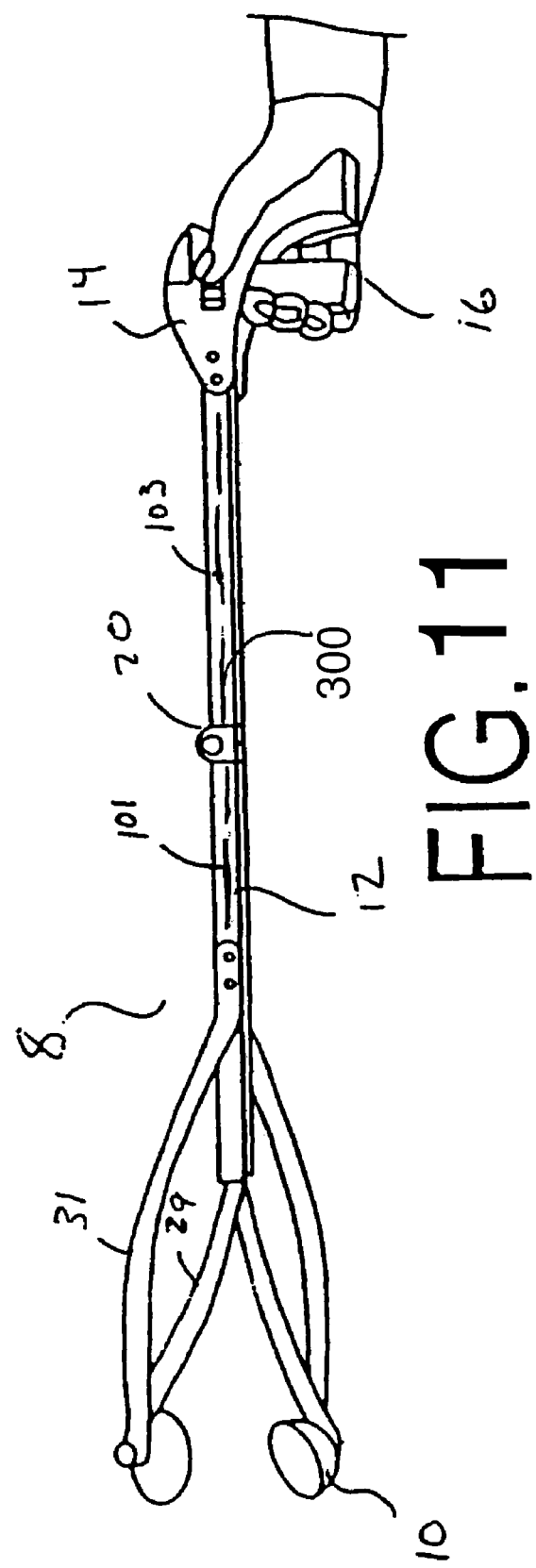
FIG. 11 illustrates a cable that connects an actuation mechanism to the engagement elements of the grabber tool.

FIGS. 9A-9C illustrate a changing shape of the channel 152 based on the relative position of the knuckle sections 115, 118, 137 139. In FIG. 10A, the hinge 105 is unlocked, and the channel 152 has a schematic circular shape extending through the hinge. Accordingly, the non-circular hinge pin 150 cannot shift. In FIG. 9B, the knuckle sections have rotated relative to each other about 90 degrees, but their channel shapes are not yet aligned, and the overall channel 152 remains circular. In FIG. 10C, the knuckle sections have rotated such that the channel sections are aligned, and the channel 152 has a non-circular "keyhole" shape, which corresponds to the schematic shape of the hinge pin 150, such that the hinge pin 150 may shift axially to the locked position. It will be appreciated that these shapes of the channel 152 and hinge pin 150 are schematic and for illustrative purposes. An exemplary shape of the hinge pin 150 and knuckle sections defining the channel is shown in FIGS. 6-8, which includes multiple projections and distributes the load around the perimeter of the channel 152.

In one aspect, the hinge pin 150 is defined by exterior section 170 and interior section 172. Interior section includes rounded head section 177 on the end of shank section 175. Shank section 175 of interior section 172 is received in opposite and complementary cavity 178 that is defined within the exterior section 170. In one aspect, the shank section 175 may have a square cross-section that is received in a corresponding square-shaped cavity. Accordingly, interior section 172 and exterior section 170 are rotationally fixed relative to each other. It will be appreciated that other corresponding cross-section shapes, or shapes that rotationally couple the interior section 172 and exterior section 170 may also be used.

In one aspect, interior section 172 can be slightly moveable axially relative to the exterior section 170, but also axially connected such that interior section 172 may push or pull exterior section 170. In another aspect, the interior section 172 may be axially fixed to the exterior section 170. Exterior section 172 defines an outer profile 181 that corresponds in shape to the shape of the axial channel 152 defined by the knuckle sections 115, 118, 137, 139 when the rod 12 is unfolded to its desired locked position.

The exterior section 170 may include multiple outer profiles at different axial locations, according to an aspect. Accordingly, in a first axial location of the exterior section 170 relative to the knuckle sections 115, 118, 137, 139, the knuckles are moveable relative to each other. In a second axial location, the knuckles 115, 118, 137, 139 are not moveable relative to each other because the hinge pin 150 blocks them. Whether the exterior section 170 is axially shiftable relative to the knuckle sections 115, 118, 137, 139 depends on the orientation of the knuckle sections relative to each other. Various types of corresponding shapes may be used for this purpose. For the purposes of discussion, a single locked position (at 180 degree orientation between proximal and distal sections 103, 101) will be illustrated and described.

With reference to FIG. 8, exterior section 170 includes outer profile 181 in the form of projections 181 that are disposed at distinct axial portions of the exterior section 170. Gaps 182 are disposed axially adjacent projections 181. Gaps 182 are disposed where the projections are not present, and define a generally circular outer profile, such that the knuckle sections that are axially aligned with the gaps 182 can rotate about the hinge pin 150. However, when the hinge pin 150 is allowed to shift, the projections 181 will move into axial alignment with the knuckle sections, blocking rotational movement.

Knuckle sections 115, 118, 137, 139 each define a recess 183 having a shape corresponding to the shape of external projections 181 when viewed axially (see FIG. 7). When the knuckles are aligned in position to be locked, the recesses 183 are aligned, allowing the external projections 181 to be received in the recesses 183. The recesses 183 combine to define the overall channel 152 through the hinge 105.

In a first axial position of exterior section 170 (such as unlocked position of FIG. 10A), projection 181 extends axially into recess 183 of knuckle section 118, but does not extend into recess 183 of adjacent knuckle section 139. Similarly, projection 181 extends into recess 183 of knuckle 115, but does not extend into recess 83 of knuckle section 137. In this position, knuckle sections 137 and 139 may be rotated relative to knuckle sections 115 and 118 (and hinge pin 150).

Knuckles sections 115 and 118, having projections 181 of exterior section engaged therewith, will cause exterior section 170 of hinge pin 150 to remain rotationally fixed therewith. If the knuckle sections 115 and 118 rotate, exterior section 170 will rotate with them. Thus, the rotation between knuckle sections is relative, and either half (or both) of the hinge 105 may be the one to move. Similarly, the hinge pin 150 may be arranged on knuckle sections 137, 139, and sections 115, 118 may be the sections that selectively engage with the projections 181 in another aspect.

In a second position (such as the locked position of FIG. 10B) of exterior section 170, projections 181 extends into both knuckles 118, 139 the other projection 181 extends into both knuckles 115, 137. Thus, all knuckles are fixed relative to each other via exterior section 170 and its projections 181, thereby locking proximal and distal sections 103, 101 together in place while exterior section 170 is in the second positon (axially shifted relative to the first position).

According to one aspect, exterior section 170 is biased toward the second position. In one aspect, a spring 186 is disposed between the head 177 of interior section 172 and the side of the hinge 105, thereby pulling the exterior section 170 toward the second position via spring force S.

When the exterior section 170 is in the first position, the head section of the exterior section 170 is spaced away from the hinge 105, thereby allowing for travel toward the second position. When the proximal and distal sections 103, 101 are in the extended position and the channel 152 matches the hinge pin 150, the interior section 172 and exterior section 170 automatically shift to left due to the spring force S from the spring 186.

In one aspect, the exterior section 170 is freely moveable toward the first position from the second position when the bias is overcome, because the projections 181 can simply exit the recesses 183 in which they are disposed. However, the exterior section 170 is not freely moveable toward the second position unless the recesses 183 are aligned, because the projections 181 must be inserted into the 183 recesses. If the recesses 183 are not aligned, the exterior section 170 is blocked because the shape of the channel does not correspond to the shape of the projections 181.

Due to the bias on the exterior section 170 toward the second position, the exterior section 170 does not need to be manually actuated to the second position. On the contrary, the bias on the exterior section 170 will automatically cause the exterior section to shift to the second position, with the recesses 183 receiving the projections 181, after which the proximal and distal sections 103 and 101 are locked in place.

The bias on the exterior section 170 thereby provides an automatic locking feature to the hinge 105. The hinge will lock upon positioning the knuckles 115, 118, 137, 139 in such a way that recesses 183 are aligned to define a channel 152 having a shape that matches the profile of the exterior section 170 of the hinge pin 150. The particular orientation may thereby be arranged depending on the needs of the user. As described herein, the recesses 183 may be arranged to align only when the rod 12 is in its fully extended position.

In one aspect, the projections 181 may be in the form of multiple projecting features that are disposed about the exterior section. Additional projections may provide additional rotational stability. The shape of the projections 181 may be selected and spaced apart in such a way so as to only become fully aligned in the desired rotational orientation. For example, a plurality of teeth 181a or the like may radiate from the exterior section 170. The teeth 181a may define the projection 181. In one aspect, six teeth 181a may be used for each projection 181 of the exterior section 170. In one aspect, one side of the projection 181 may be flattened between adjacent teeth 181a to define a flat surface 181b. The flat surface 181b may also be described as the alignment feature 181b. Alignment feature 181b will match a corresponding flat surface 183a on the recesses 183. The alignment feature 181b may be disposed on only one radial side of the projections 181, such that rotation of the recesses 183 will result in alignment at a predetermined angular position corresponding to the desired locked position. Until the flat alignment feature 181b aligns with alignment feature 183a of the recess, the projection 181 and exterior section cannot shift into the locked position.

In one aspect, a hinge housing 187 may be provided. The head sections of the interior section 172 and exterior section 170, respectively, may bear against the outer surfaces of the hinge housing 187. The hinge housing may include a closed section (shown on the right in FIG. 6) that surrounds one of the proximal section 103 or distal section 101, and may have a u-shape on the opposite end, thereby allowing the proximal and distal sections 103, 101 to fold toward each other in a single direction, and to be blocked from pivoting beyond the fully extended position and ensuring that that exterior section 170 will automatically translate to the locked position when the device is fully unfolded. The hinge housing 187 operates in addition to, or as an alternative to, the stop surfaces described above, to prevent a hyperextension condition from occurring.

With the exterior section 170 in its locked position, to release the lock, interior section 172 may be depressed axially toward exterior section 170, with the head 177 contacting the end of exterior section 170 and forcing exterior section 170 to its first position. The bias on the exterior section 170 remains. Accordingly, releasing the head of the interior section 172 will allow exterior section 170 to return to the locked second position.

Thus, to fold the device, the rod 12 is folded while the head 177 of the interior section 172 is pressed. Once the device has been at least partially folded, the interior section 172 may be released, and the exterior section 170 will be blocked from returning to the locked position because the recesses 183 are no longer aligned. When the recesses 183 return to an aligned position, the exterior section 170 will once against automatically move to the locked position.

In addition to the automatic locking feature, the device is further configured to automatically open when released from its folded state. Actuation cable 300 extends through the hollow cavity of the proximal and distal sections 103, 101 and through the hinge 105. In one aspect, the cable 300 is disposed on the side of the hinge 105 that is opposite the direction of folding. Accordingly, when the device is folded, cable 300 wraps around the outer edge of the hinge pin 150. By wrapping around the outer edge of the hinge pin 150, the cable 300 is put in tension, which pulls on connector members 29 that are attached at the end of the cable 300. The connector members 29 are pulled into distal end of the distal section and springs 31 put in tension. Thus, a biasing force on the cable 300 is created when folded. Releasing the distal section 101 from its folded position thereby allows the springs 31 to pull the connector members 29 out of the distal end, which pulls on cable 300 and drags the distal section 101 to rotate about the hinge axis. Thus, the tension of the cable 300 and the springs 31 will automatically transition the device toward the locked position, where the hinge pin 150 will automatically lock the device in its extended position. Additional tension may be added to the cable 300 by pulling the trigger 16, which may speed the rate that the rod 12 transitions to the automatically locked position.

While the preferred embodiments have been described herein, those skilled in the art will recognize that certain details may be changed without departing from the spirit and scope of the invention. Thus, the foregoing specific embodiments and applications are illustrative only and are not intended to limit the scope of the invention. It is contemplated that the invention will be functional and effective in diverse applications where it is desirable to engage or otherwise manipulate objects from a remote distance. Likewise, although the locking hinge structure is particularly useful in connection with elongate grabber tools, the hinge may also be employed on other rod statures where there is need.

What is claimed is:

1. A foldable elongate grabber tool comprising:
   an elongate rod having a proximal section and a distal section, wherein the proximal section and distal section and foldable relative to each other;
   a handle disposed at a proximal end of the proximal section;
   engagement elements disposed at a distal end of the distal section;
   an actuation mechanism disposed at the handle and configured to actuate the engagement elements;
   a hinge mechanism connecting the proximal section to the distal section;
   a locking mechanism extending through the hinge mechanism;
   wherein the proximal section and the distal section are biased toward an extended position, wherein the proximal section and distal section automatically move from a folded position to the extended position when released from the folded position;
   wherein the hinge mechanism automatically locks the proximal section relative to the distal section in response to reaching the extended position;
   wherein a cable extends between the actuation mechanism and the engagement elements, wherein actuation of the actuation mechanism pulls on the cable to pull the engagement elements together;
   wherein the cable pulls the engagement elements together when the proximal section and distal section are in the folded position;
   wherein tension in the cable when the proximal and distal section are in the folded position provides a biasing force to move the proximal and distal section toward the extended position.

2. The tool of claim 1, wherein the hinge mechanism includes a forward portion and a rear portion, wherein the forward portion includes at least one forward knuckle and the rear portion includes at least one rear knuckle, wherein the forward knuckle and rear knuckle are rotatable relative to each other when the hinge mechanism is in an unlocked state.

3. The tool of claim 2, wherein the forward knuckle and rear knuckle are prevented from rotating relative to each other when the hinge mechanism is in a locked state.

4. The tool of claim 1, wherein the locking mechanism includes a hinge pin extending axially through a channel defined by at least one forward knuckle and at least one rear knuckle.

5. The tool of claim 4, wherein the hinge pin has an outer profile corresponding to a profile of the channel when the proximal and distal sections are in the extended position, wherein the hinge pin is axially shiftable into the channel in the extended position to lock the proximal section relative to the distal section.

6. The tool of claim 5, wherein the forward knuckle and rear knuckle each define a recess having a profile, wherein the recess profiles are aligned with the outer profile of the hinge pin when the proximal and distal section are in the extended position.

7. The tool of claim 1, wherein the locking mechanism is biased toward a locked position.

8. The tool of claim 1, wherein when the proximal and distal sections are in the folded position the locking mechanism is in an unlocked state and biased toward a locked state, wherein the locking mechanism is blocked from shifting to the locked state until the proximal and distal sections reach the extended position.

9. The tool of claim 8, wherein the locking mechanism is axially moveable from the locked state toward the unlocked state after shifting to the locked state in response to overcoming a biasing force on the locking mechanism.

10. The tool of claim 9, wherein the proximal and distal sections are moveable from the extended position toward the folded position in response to overcoming the biasing force on the locking mechanism.

11. The tool of claim 10, wherein the locking mechanism is blocked from returning to the locked state after overcoming the biasing force on the locking mechanism and after moving the proximal and distal sections toward the folded position.

12. A method of operating a foldable elongate grabber tool, the method comprising the steps of:
   providing an elongate grabber tool having a proximal section and a distal section in a folded position;
   wherein the elongate grabber tool includes a handle disposed at a proximal end of the proximal section, engagement elements disposed at a distal end of the distal section, an actuation mechanism disposed at the handle and configured to actuate the engagement elements;
   releasing the proximal section and the distal section from the folded position;
   in response thereto, automatically moving the proximal section and the distal section relative to each other about a hinge mechanism and toward an extended position;
   in response to reaching the extended position, automatically locking the proximal section and the distal section relative to each other in the extended position via a locking mechanism disposed at the hinge mechanism; and after automatically locking the proximal section and the distal section, blocking the proximal section and the distal section from moving toward the folded position;

wherein a cable extends between the actuation mechanism and the engagement elements, wherein actuation of the actuation mechanism pulls on the cable to pull the engagement elements together;

wherein the cable pulls the engagement elements together when the proximal section and distal section are in the folded position;

wherein tension in the cable when the proximal and distal section are in the folded position provides a biasing force to move the proximal and distal section toward the extended position.

13. The method of claim 12, wherein the locking mechanism includes a hinge pin biased toward a locked position from an unlocked position, wherein the hinge pin automatically shifts axially into the locked position in response to the proximal and distal sections reaching the extended position.

14. The method of claim 13, wherein the hinge mechanism includes at least one forward knuckle and at least rear knuckle, wherein each of the knuckles defines a recess having a profile, wherein the hinge pin has an outer profile corresponding to the profile of the recesses.

15. The method of claim 14 further comprising rotating the recesses relative to each during movement of the proximal section relative to the distal section, wherein the recesses are aligned relative to each other such that the hinge pin is blocked from axial movement into the locked position when the proximal and distal sections are not in the extended position, wherein the bias on the hinge pin holds the hinge pin in the locked position, whereat the hinge pin blocks the proximal section and distal section from moving toward the folded position.

16. The method of claim 13 further comprising pushing the hinge pin out of the locked position when the proximal and distal sections are in the extended position, holding the hinge pin in the unlocked position, and folding the proximal section relative to the distal section while the holding the pin in the unlocked position.

17. The method of claim 16 further comprising releasing the hinge pin after folding the proximal section relative to the distal section, an continuing to fold the proximal section relative to the distal section after releasing the hinge pin, wherein the hinge pin is blocked from returning to the locked position while the proximal section and distal section are being folded.

* * * * *